(12) United States Patent
Tatewaki et al.

(10) Patent No.: US 6,860,360 B2
(45) Date of Patent: Mar. 1, 2005

(54) ELECTRIC POWER STEERING APPARATUS

(75) Inventors: Osamu Tatewaki, Gunma-ken (JP);
Hiroshi Eda, Gunma-ken (JP);
Toshihiro Fukuda, Gunma-ken (JP);
Osamu Saito, Gunma-ken (JP); Jun Okada, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/641,108

(22) Filed: Aug. 15, 2003

(65) Prior Publication Data
US 2004/0050615 A1 Mar. 18, 2004

Related U.S. Application Data

(62) Division of application No. 10/166,175, filed on Jun. 11, 2002, now Pat. No. 6,662,897.

(30) Foreign Application Priority Data

| Jun. 15, 2001 | (JP) | 2001-181967 |
| Feb. 8, 2002 | (JP) | 2002-032818 |
| Mar. 6, 2002 | (JP) | 2002-060742 |
| Mar. 20, 2002 | (JP) | 2002-078481 |

(51) Int. Cl.$^7$ ................................ B62D 5/04
(52) U.S. Cl. ................................ 180/444
(58) Field of Search ................ 180/443, 444, 180/445, 446

(56) References Cited

U.S. PATENT DOCUMENTS

| 4,825,972 A | 5/1989 | Shimizu | 180/79.1 |
| 4,837,692 A * | 6/1989 | Shimizu | 701/141 |
| 4,853,672 A | 8/1989 | Yasuda et al. | 340/465 |
| 5,487,439 A * | 1/1996 | Kabuto et al. | 180/445 |
| 5,988,005 A | 11/1999 | Onodera et al. | 74/388 PS |
| 6,082,483 A | 7/2000 | Taniguchi et al. | 180/444 |
| 6,107,716 A | 8/2000 | Penketh | 310/89 |
| 6,237,713 B1 | 5/2001 | Onodera et al. | 180/444 |
| 2002/0166715 A1 * | 11/2002 | Tomago et al. | 180/443 |
| 2003/0188918 A1 * | 10/2003 | Shimizu et al. | 180/444 |

FOREIGN PATENT DOCUMENTS

| DE | 43 03 674 | 8/1994 |
| EP | 0 376 456 | 7/1990 |
| EP | 0 870 669 | 10/1998 |
| FR | 2 639 308 | 5/1990 |
| GB | 2 230 749 | 10/1990 |
| JP | 2-46455 | 12/1990 |
| JP | 5-14939 | 4/1993 |
| WO | WO 01/15959 | 3/2001 |

* cited by examiner

Primary Examiner—Kevin Hurley
(74) Attorney, Agent, or Firm—Miles & Stockbridge P.C.

(57) ABSTRACT

An electric power steering apparatus includes a power assist mechanism encased by a steering gear case, an electric motor coupled to the power assist mechanism, a power transmission mechanism, coupled to the electric motor and the power assist mechanism, and a protection cover, separate from the electric motor casing and attached thereto, for covering the electric motor.

10 Claims, 10 Drawing Sheets

ELECTRIC POWER STEERING APPARATUS

CROSS-REFERENCE TO RELATED APPLICATION

This application is a division of Application No. 10/166,175 filed Jun. 11, 2002 now U.S. Pat. No. 6,662,897.

This application claims the benefit of Japanese Patent Applications No. 2001-181967, No. 2002-032818, No. 2002-060742 and No. 2002-078481 which are hereby incorporated by reference.

BACKGROUND OF THE INVENTION

1. Field of the Invention

The present invention relates to an electric power steering apparatus for an automobile.

2. Related Background Art

Steering systems of automobiles widely use a so-called power steering apparatus for assisting a steering operation by use of an external power source. the power source for the power steering apparatus has hitherto involved the use of a vane hydraulic pump, and this hydraulic pump is driven by the engine in many cases. This type of power steering apparatus has, however, a large drive loss (on the order of several through ten horsepower (HP) at a maximum load) of the engine because of driving the hydraulic pump at all times and is therefore hard to apply to mini-sized motor vehicle having small displacements. Even the automobiles having comparatively large displacements, when installed, come to have such an inevitable demerit that their traveling fuel efficiencies become low enough not to be ignorable.

Such being the case, an electric power steering (which will hereinafter be abbreviated to EPS) involving the use of an electric motor as a power source has attracted the attention over the recent years for obviating those problems. The EPS apparatus exhibits characteristics, wherein there is no direct drive loss of the engine because of using a battery loaded into the car as a power source for the electric motor, a decrease in the traveling fuel efficiency is restrained as the electric motor is started only when assisting the steering operation, and in addition the electronic control can be extremely easily performed.

On the other hand, a steering gear for the automobile is high in rigidity and low in weight, and hence a rack-and-pinion steering gear is mainly employed at the present. Then, the EPS apparatuses for the rack-and-pinion steering gear include a column assist type in which the electric motor is disposed sideways of the column in order to drive a steering shaft and a pinion itself, and in addition a ball screw rack assist type in which a rack shaft is driven by an electrically-driven ball screw mechanism. In the ball screw rack assist type EPS apparatus (which will hereinafter be simply called the rack assist type EPS apparatus), the assist force does not act on a meshing surface between the pinion and the rack, and therefore a contact surface pressure between these two members, which is to be a factor for abrasion and deformation as well, is comparatively small.

According to the rack assist type EPS apparatus, a ball screw shaft male thread groove formed in a rack shaft engages with a female thread groove formed in a ball nut through a multiplicity of circulation balls (steel balls), and the ball nut is rotated by the electric motor, thereby moving the rack shaft in the axial directions. A power transmission method for transmitting the power from the electric motor to the ball nut may be a timing belt system disclosed in Japanese Utility Model Publication No.5-14939 (a first prior art) etc, however, a general method is a gear system disclosed in Japanese Utility Model Publication No.2-46455 (a second prior art) etc.

(1) In a rack assist type EPS apparatus, an electric motor is installed by using bolts to a steering gear case, and the installing mode thereof is classified into a one-point support type and a two-point support type. For example, according to the second prior art, the electric motor is fastened at its one end by bolts to a ball screw mechanism housing protruding from the steering gear case. Further, according to the first prior art, the electric motor is fastened at its one end by bolts to the ball screw mechanism housing and further fastened at the other end likewise by bolts to the side surface of the steering gear case.

By the way, the rack assist type EPS apparatus adopts in many cases the electric motor that is small in its major diameter and comparatively large in its total length in terms of a space for installation for the convenience's sake of being attached to the steering gear disposed at a lower portion of the car body. Therefore, if the electric motor is attached in the one-point support mode to the steering gear case, an inertial moment is large due to vibrations caused when traveling on a rough road etc, and an excessive bending stress etc acts on the steering gear case, with the result that the steering gear case might be deformed and damaged. Then, when scheming to increase a rigidity and a strength of the electric motor fitting portion (the ball screw mechanism housing etc) of the steering gear case in order to prevent the deformation, damage and so on, increases in frame size and in weight are inevitable from a necessity of obtaining an increased wall thickness of this fitting portion.

While on the other hand, in the case of fitting the electric motor to the steering gear case in the two-point support mode, if the steering gear case gets flexural due to the vibrations caused when traveling and if the electric motor undergoes a thermal expansion due to frequent actuations thereof, a distance between the supporting or fitting portions to the steering gear case is not coincident with a total length of the electric motor. As a result, a compression stress or a tensile stress acts on the electric motor and on the steering gear case, with the result that the electric motor might fall into a failure and the steering gear case might be deformed and damaged. Further, in the case of taking a structure in which the steering gear case and the electric motor are disposed horizontally in a way that support the side surface of the electric motor with a stay in order to ensure a minimum road clearance in the electric power steering apparatus, dusts and mud accumulate in between the steering gear case and the electric motor and on an upper surface of the shelved stay, and then contain a water content of rain, resulting in rusting of each of the constructive members as the case may be.

(2) A rack assist type EPS apparatus, of which an electric motor is disposed on a axis different from the ball nut, uses the electric motor that is larger in output and in size than a coaxially-disposed electric motor, and hence it is difficult to ensure a heat-radiation air space in periphery of the electric motor. Consequently, a temperature of the electric motor receiving the heat from the engine, an exhaust pipe etc, rises depending on where the electric motor is installed, and a predetermined output might not be obtained.

It is desirable for preventing this rise in temperature that the electric motor be installed as far away from the heat source as possible. To be specific, since the engine and the exhaust pipe are disposed comparatively upward, a lower portion of the engine room is highly available for installing the electric motor. In the case of installing the electric motor in the vicinity of the steering gear case, however, it is required that the minimum ground clearance should not be reduced to the greatest possible degree in order to avoid interference with an obstacle when traveling on the rough road.

(3) In a rack assist type EPS apparatus with an electric motor disposed on an axis different from the ball nut, it follows that the electric motor is positioned in the lower portion of the car body, which is comparatively close to the road surface. It is therefore inevitable that the water is splashed over the electric motor and an electric harness thereof when traveling in the rain and passing through the puddles and that the pebbles rebounding from the tires when traveling on the rough road impinge thereon.

As known well, the output (torque generated) of the electric motor changes depending on its temperature, and hence, when the electric motor is abruptly cooled by the splashed water, it follows that the steering assist force of the EPS apparatus changes abruptly. This has been a factor for hindering smooth steering by the driver and making a steering feeling unagreeable. Further, the impingement of the pebbles upon the electric motor, the electric harness, a connector and so forth, has been a factor for rusting due to exfoliation of coating and plating on the motor body and for causing a disconnection and a short-circuit of the electric circuit. On the other hand, a housing generally composed of an aluminum alloy etc accommodates a gear train and a belt defined as a power transmission mechanism between the electric motor and the power assist mechanism, but might be cracked by the impingement of the rebounding pebbles, with the result that a lubricant might leak out and the muddy water might permeate, and so on.

SUMMARY OF THE INVENTION

It is an object of the first invention, which as devised to obviate the problem (1) given above, to provide a rack assist type electric power steering apparatus capable of improving a method of supporting an electric motor.

According to the first invention, an electric power steering apparatus comprises an electric motor having a motor housing, a ball screw mechanism connected to the electric motor through a power transmission mechanism and used for driving a rack shaft, and a steering gear case encasing the rack shaft and the ball screw mechanism, wherein the electric motor is supported by at least two supporting portions with respect to the steering gear case, and is supported by at least one of the two supporting portions through an elastic member.

According to the first invention, the electric motor is supported by the two or more support portions, and therefore an excessive bending stress etc does not act on the steering gear case even when traveling on a bad road etc. Further, the electric motor is elastically supported by at least one support portion, and hence, even when the steering gear case get flexural and the electric motor thermally expands, almost no compression stress nor tensile stress acts on the both.

Further, in the electric power steering apparatus according to the first invention, preferably a small-diameter portion may be formed at an end portion of the motor housing, and one portion of the supporting portions may be used for supporting the small-diameter portion. With this contrivance, a support bracket etc can be downsized, whereby both of a weight of the apparatus and a manufacturing cost can be reduced.

In the electric power steering apparatus according to the first invention, preferably a vertical elastic coefficient of the elastic member may change stepwise. With this scheme, for instance, minute vibrations of the electric motor are absorbed by the elastic member in an area exhibiting a low vertical elastic coefficient, while a comparatively large relative shift occurred between the steering gear case and the electric motor is absorbed by the elastic member in an area exhibiting a comparatively high vertical elastic coefficient, thereby preventing bottoming and a metal touch as well.

In the electric power steering apparatus according to the first invention, preferably the elastic member may elastically support the motor housing in axial and radial directions. Owing to this configuration, the vibrations of the electric motor and an axial stretch thereof are absorbed by the single elastic member.

In the electric power steering apparatus according to the first invention, preferably the steering gear case and the motor housing may be disposed substantially horizontally, and an air gap may be formed between the steering gear case and the motor housing. With this configuration, the dusts drop down from an air gap formed between the steering gear case and the motor housing due to the vibrations etc when traveling.

It is an object of the second invention, which was devised to obviate the problem (2) given above, to provide an electric power steering apparatus capable of ensuring a minimum ground clearance in a vehicle in a way that prevents thermal damages to the electric motor.

To accomplish the above object, an electric power steering apparatus of a rack assist type according to the second invention comprises a steering gear case encasing a power assist mechanism, and an electric motor disposed on the axis different from the steering gear case and used for driving the power assist mechanism, wherein minimum road clearances up to the steering gear case and the electric motor when mounted in a vehicle are made substantially coincident.

According to the second invention, it is possible to increase a distance between the electric motor and a thermal source of an engine etc without decreasing the minimum ground clearance in the vehicle.

In the electric power steering apparatus according to the second invention, preferably the electric motor may be disposed in front of the steering gear case. With this arrangement, a traveling wind is blown directly on the electric motor without being hindered by the steering gear case, thereby restraining a heat emission of the electric motor.

It is an object of the third invention, which was devised to obviate the problem (3) given above, to provide an electric power steering apparatus capable of protecting an electric motor from the splashed water and rebounding pebbles when traveling.

To accomplish the above object, an electric power steering apparatus of a rack assist type according to the third invention comprises a steering gear case encasing a power assist mechanism, an electric motor disposed on the axis different from the steering gear case and used for driving the power assist mechanism, and a power transmission mechanism interposed between the electric motor and the power assist mechanism, wherein a protection cover for covering the electric motor is provided.

In the electric power steering apparatus according to the third invention, preferably a housing accommodating the power transmission mechanism may be covered by a protection cover integral with or separate from the protection cover. With this configuration, the protection cover prevents the water from splashing over the housing for the electric motor and the power transmission mechanism and the rebounding pebbles from impinging thereon.

DESCRIPTION OF THE PREFERRED EMBODIMENTS

Embodiments of the present invention will hereinafter be described with reference to the accompanying drawings.

Figure 1:
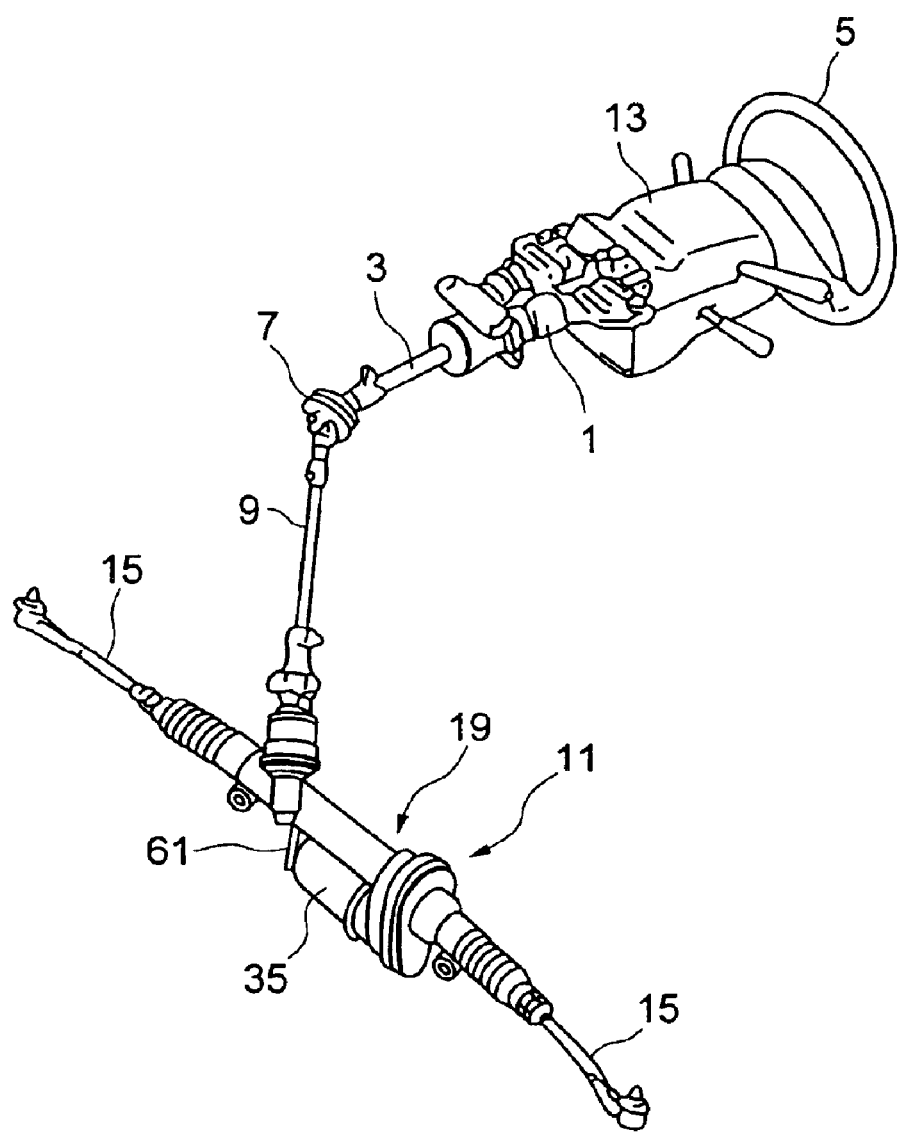
FIG. 1 is a perspective view showing a car-compartment sided portion of an electric power steering apparatus in a first embodiment of the first invention.

FIG. 1 is a perspective view showing a car-compartment sided portion of an electric power steering apparatus in a first embodiment of the first invention. A member indicated by the numeral 1 in FIG. 1 is a steering column. The steering column supports an upper steering shaft 3 rotatably. A steering wheel 5 is attached to an upper end of the upper steering shaft 3. A lower steering shaft 9 is joined via a universal joint 7 to a lower end of the shaft 3. Further, a steering gear 11 constructed of a rack-and-pinion mechanism, a power assist mechanism etc is connected to a lower end of the lower steering shaft 9. Referring again to FIG. 1, the numeral 13 represents a column cover for covering the steering column 1, and the numeral 15 denotes tie rods connected to right and left side ends of the steering gear 11.

Figure 2:
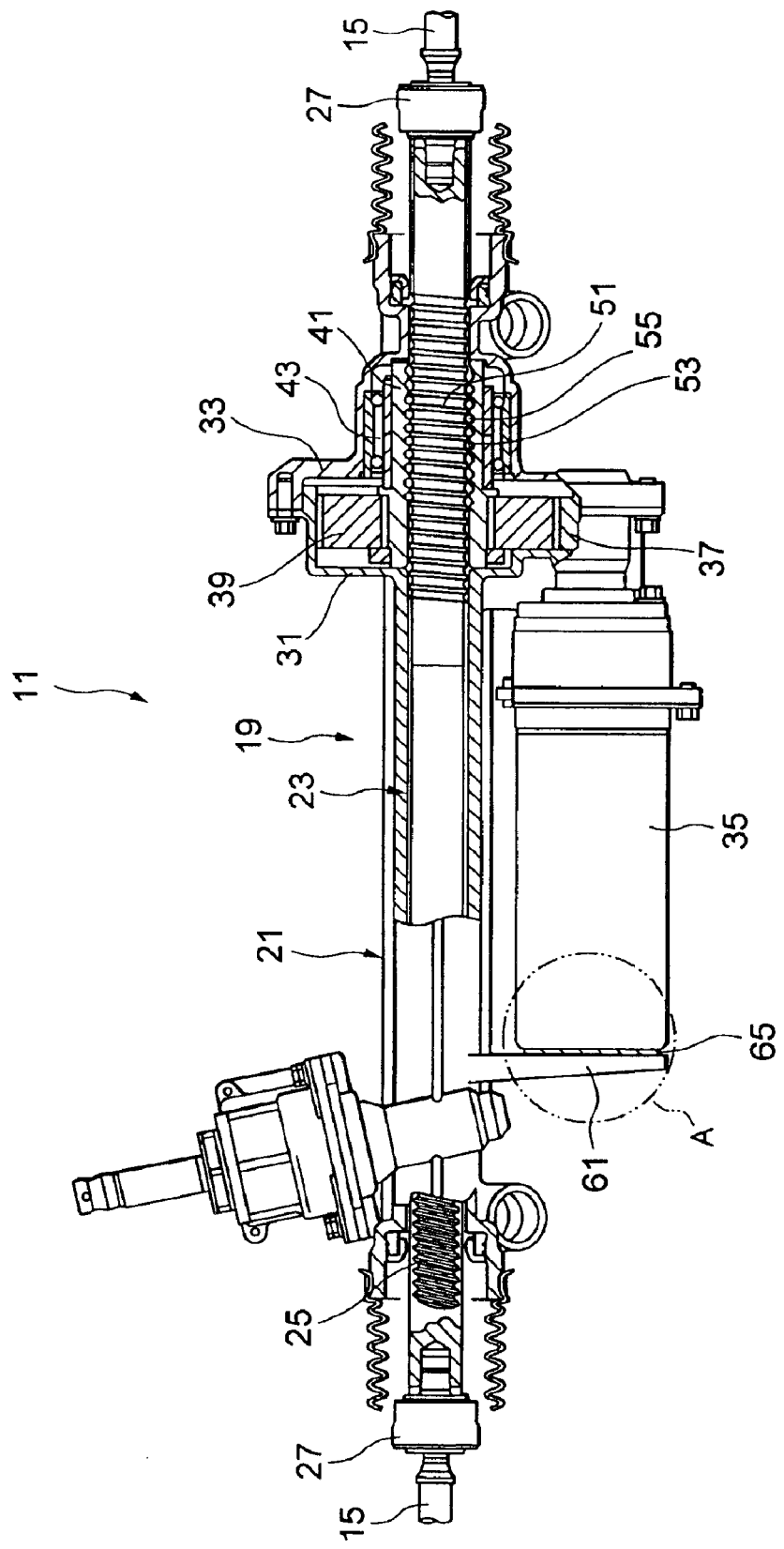
FIG. 2 is a vertical sectional view showing a steering gear in the first embodiment.

FIG. 2 is a vertical sectional view showing principal components of the steering gear 11 in the first embodiment. A member indicated by the numeral 21 in FIG. 2 is a rack-and-pinion housing configuring a steering gear case 19. The steering gear case 19 encases a rack shaft 23 and a pinion (not shown) held therein, which constitute the rack-and-pinion mechanism. The rack shaft 23 has a rack 25 provided on the left side in FIG. 2 and meshing with the pinion. Spherical joints 27 supporting the tie rods 15 in a swayable manner are fixed to the right and left side ends of the rack shaft 23.

The power assist mechanism has its shell configured by a gear housing 31 formed at the right side end, as viewed in FIG. 2, of the rack-and-pinion housing 21, and by a ball screw housing 33 constituting the steering gear case 19 together with the rack-and-pinion housing 21 fastened by bolts to the gear housing 31. The gear housing 31 accommodates a drive gear 37 with its lower portion to which the right end, as viewed in FIG. 2, of an electric motor 35 is fastened by bolts, this gear 37 being fixed to a motor shaft (unillustrated), and a driven gear 39 meshing with the drive gear 37. Further, the ball screw housing 33 accommodates a ball nut 41 with its outer periphery to which the driven gear 39 is spline-fitted, wherein the ball nut 41 is rotatably held through a double-row angular ball bearing 43.

The rack shaft 23 is formed with a male thread groove 51, while the ball nut 41 is formed with a female thread groove 53, and a multiplicity of steel balls 55 defined as circulation balls are interposed between the male thread groove 51 and the female thread groove 53. Moreover, the ball nut 41 is fitted with circulation pieces (not shown) for assisting the circulation of the steel balls 55.

Figure 3:
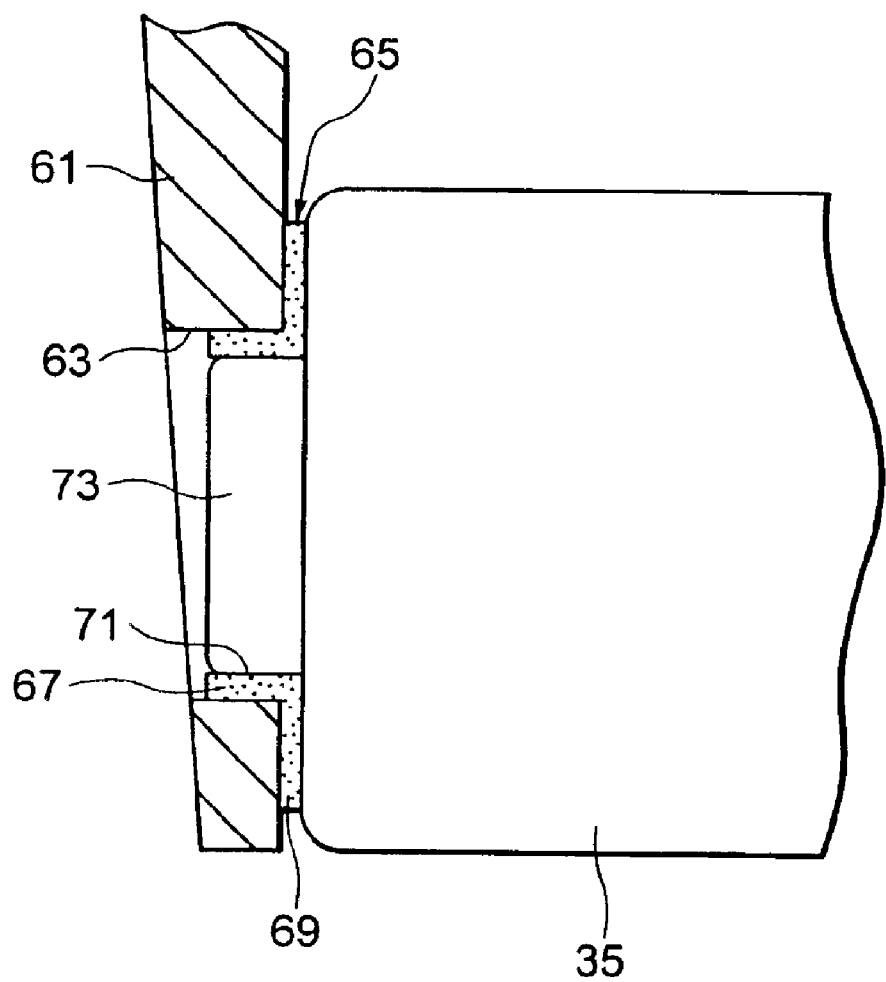
FIG. 3 is an enlarged sectional view of a portion A in FIG. 2.

The right end, as viewed in the FIG. 2, of the electric motor 35 in the first embodiment is, as described above, fastened by the bolts to the gear housing 31 and to the rack-and-pinion housing 21. Further, the left side end, as viewed in the FIG. 2, of the electric motor 35 is supported by a motor bracket 61 extending from the rack-and-pinion housing 21. As depicted in FIG. 3 (which is an enlarged sectional view of a portion A in FIG. 2), the motor bracket 61 is formed with a support hole 63 having a comparatively large diameter. An elastic support ring 65 formed by molding a synthetic rubber and so on, is inset along this support hole 63. The elastic support ring 65 is comprised of a cylindrical member 67 internally fitted to the support hole 63, and a flange member 69 brought into contact with a side end surface of the motor bracket 61. The cylindrical member 67 is formed with a holding hole 71. A small-diameter portion 73 is provided at the left side end, as viewed in the FIG. 3, of the electric motor 35 and is fitted in and held by the holding hole 71 of the elastic support ring 65.

An operation in the first embodiment will hereinafter be described.

When a driver rotates the steering wheel 5, a rotational force thereof is transferred to the steering gear 11 via the upper steering shaft 3 and the lower steering shaft 9. The steering gear 11 has a built-in rack-and-pinion mechanism for converting the rotational input into a rectilinear motion. With this mechanism, the rack shaft 23 moves in any one of the right and left directions, and a steering angle of the dirigible wheels changes through the right and left tie rods 15, thus performing a steering operation. On this occasion, within the power assist mechanism, the electric motor 35, based on an output of an unillustrated steering torque sensor, rotates with a predetermined rotational torque in a forward or reversed direction, and the rotations thereof are decelerated and thus transferred to the ball nut 41 via the driven gear 39. Upon rotations of the ball nut 41, a thrust force acts on the male thread groove 51 of the rack shaft 23 through the steel balls 55 fitted in the female thread groove 53, thereby attaining a steering assist.

According to the first embodiment, the electric motor 35 is supported in the rack-and-pinion housing 21 through the gear housing 31 and the motor bracket 61, whereby large vibrations do not occur unnecessarily even when traveling on a bad road etc, and an excessive bending stress does not act on the gear housing 31. Consequently, there comes to no need for increasing unnecessarily a wall thickness of the gear housing 31 etc, and increases both in frame size and in weight thereof can be avoided.

Further, since the electric motor 35 is elastically supported through the elastic support ring 65 on the motor bracket 61, even when the rack-and-pinion housing 21 becomes flexural due to the vibrations during traveling or the electric motor undergoes a thermal expansion, a difference between a total length of the electric motor 35 and a distance between the fitting portions of the steering gear case 19, is absorbed. Note that the minute radial vibrations of the electric motor 35 are absorbed by a flexure of the cylindrical portion 67 of the elastic support ring 65, while an axial expansion of the electric motor 35 is absorbed by the flange portion 69 being compressed. As a result, almost no compression stress nor tensile stress acts on the electric motor 35 and the steering gear case 19, whereby a failure of the electric motor 35 and a deformation of and a damage to the steering gear case 19 become hard to occur.

Figure 4:
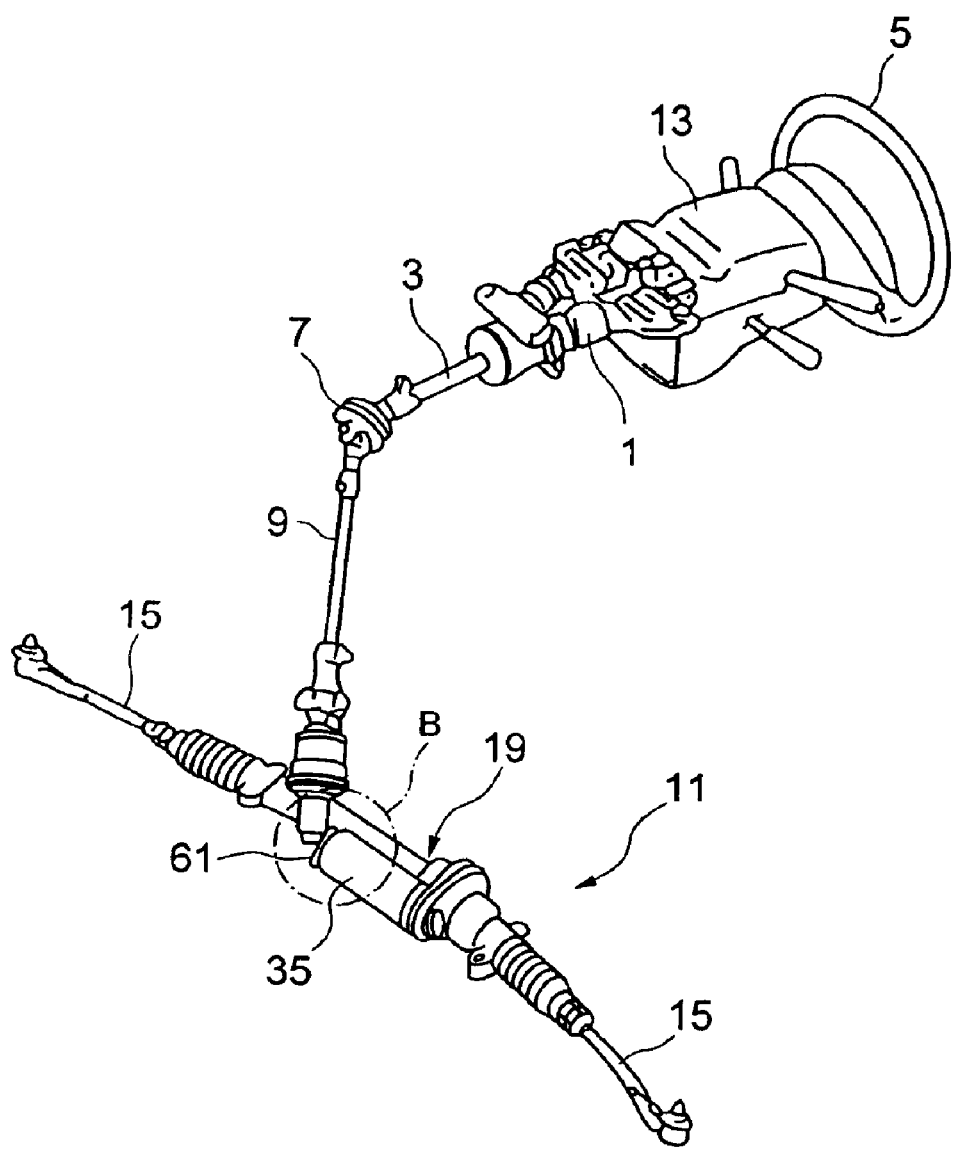
FIG. 4 is a perspective view showing a car-compartment sided portion of the electric power steering apparatus in a second embodiment of the first invention.
Figure 5:
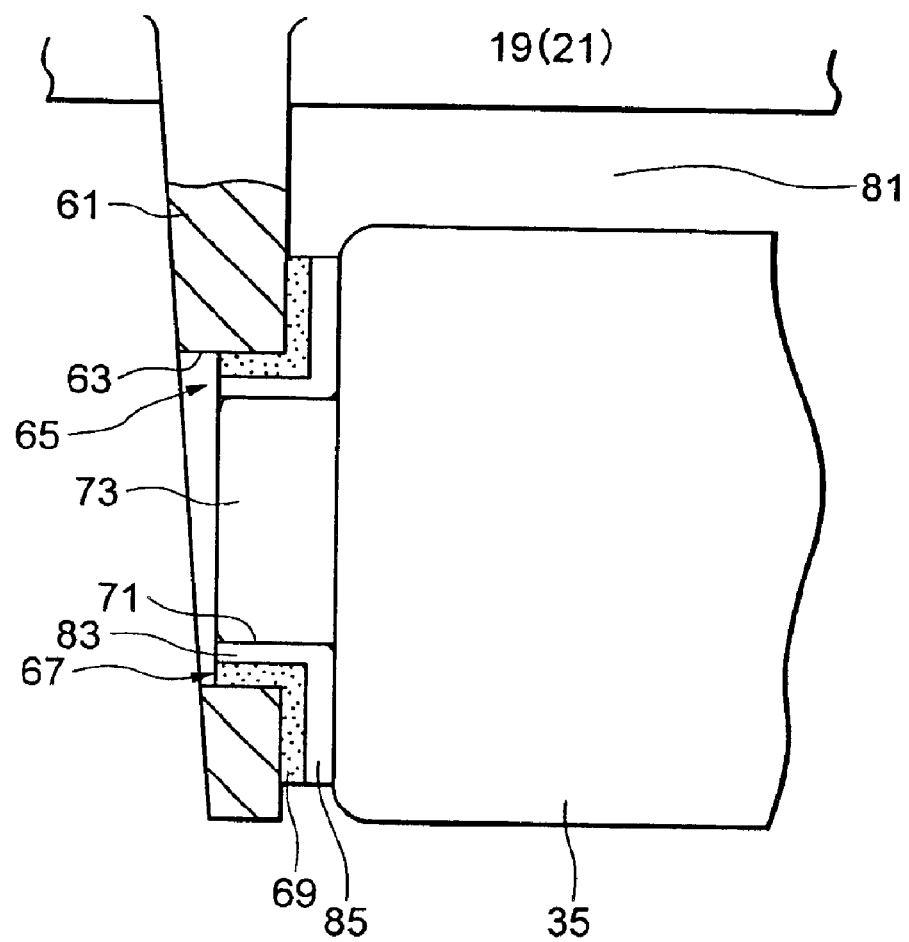
FIG. 5 is an enlarged sectional view showing a portion B in FIG. 4.

FIG. 4 is a perspective view showing a car-compartment sided portion of the electric power steering apparatus in a second embodiment. FIG. 5 is an enlarged sectional view showing a portion B in FIG. 4. As depicted in FIGS. 4 and 5, the second embodiment takes substantially the same configuration as in the first embodiment, however, differences are a position where the electric motor 35 is disposed and a structure of the elastic support ring 65. To be specific, the electric motor 35 is disposed in front of the steering gear case 19 in order to ensure a minimum ground clearance, and a predetermined air gap 81 is formed between the electric motor 35 and the steering gear case 19. Further, a plurality of rectilinear lightening holes 83 are formed in the cylindrical member 67 in order to reduce a vertical elastic coefficient of the portion contiguous to the electric motor 35. Further, a plurality of radial lightening holes 85 are formed in the flange member 69.

According to the second embodiment, the air gap 81 is formed between the steering gear case 19 and the electric motor 35, and hence dusts, mud etc, even if splashed over the steering gear when traveling on the rough road and a muddy ground, are dropped down via the air gap 81. With this contrivance, rusting conceived as a problem inherent in the conventional apparatuses and derived from adhesions of the dusts and mud containing the water content, does not occur on the respective constructive members.

On the other hand, with respect to the elastic support ring 65, if the vibrations and the axial expansion of the electric motor 35 are comparatively small, the portions formed with the lightening holes 83, 85 and therefore exhibiting a low vertical elastic coefficient are comparatively easy to deform. Owing to these deformations, no excessive stress acts on the steering gear case 19 and the electric motor 35, and at the same time the vibrations are restrained from being transferred to the steering gear case 19. Whereas if the vibrations and the axial expansion of the electric motor 35 are comparatively large, the portions unformed with the lightening holes 83, 85 and therefore exhibiting a high vertical elastic coefficient do not, though deformed somewhat, deform so much as getting completely collapsed under a normal driving condition. It is therefore possible to prevent the elastic support ring 65 from bottoming and a metal touch between the electric motor 35 and the motor bracket 61.

The explanations of the specific embodiments of the first invention come to an end, however, the mode of the first invention is not limited to the embodiments discussed above. For instance, the electric motor is supported at the two portions according to the embodiments described above and may also be supported at three or more portions. In this case, it is desirable that the electric motor be elastically supported at the two or more portions. Further, in the embodiments discussed above, the present invention is applied to the rack assist type EPS apparatus involving the use of the gear for the power transmission mechanism and may also be applied to the EPS apparatuses using, without being limited to the gear, chains, friction rollers or belts for the power transmission mechanism. Further, according to the second embodiment, the elastic support ring is formed with the lightening holes in order for the vertical elastic coefficient to change at two levels, however, the same operational effect can be obtained by combining two types of synthetic rubbers exhibiting different elastic coefficients, or the vertical elastic coefficient can be also changed at three or more levels. Moreover, from the configuration of the elastic member down, the whole construction of the steering gear and the structure of the power assist mechanism are not confined to the exemplifications shown in the embodiments discussed above and can be, if within the range that does not depart from the concept of the present invention, properly changed based on requests in terms of designs and specifications.

As discussed above, the electric power steering apparatus of the first invention includes the electric motor, the ball screw mechanism connected to the electric motor through the power transmission mechanism and used for driving the rack shaft, and the steering gear case encasing the rack shaft and the ball screw mechanism, wherein the electric motor is supported by at least two supporting portions formed in the steering gear case, and the electric motor is elastically supported by at lest one of the two supporting portions. With this configuration, the excessive bending stress does not act on the steering gear case when traveling on the rough road etc, and besides, even when the flexure of the steering gear case and the thermal expansion of the electric motor occur, almost no compression stress nor tensile stress acts on the steering gear case and the electric motor.

Embodiment of a second invention will hereinafter be discussed with reference to the drawings.

Figure 6:
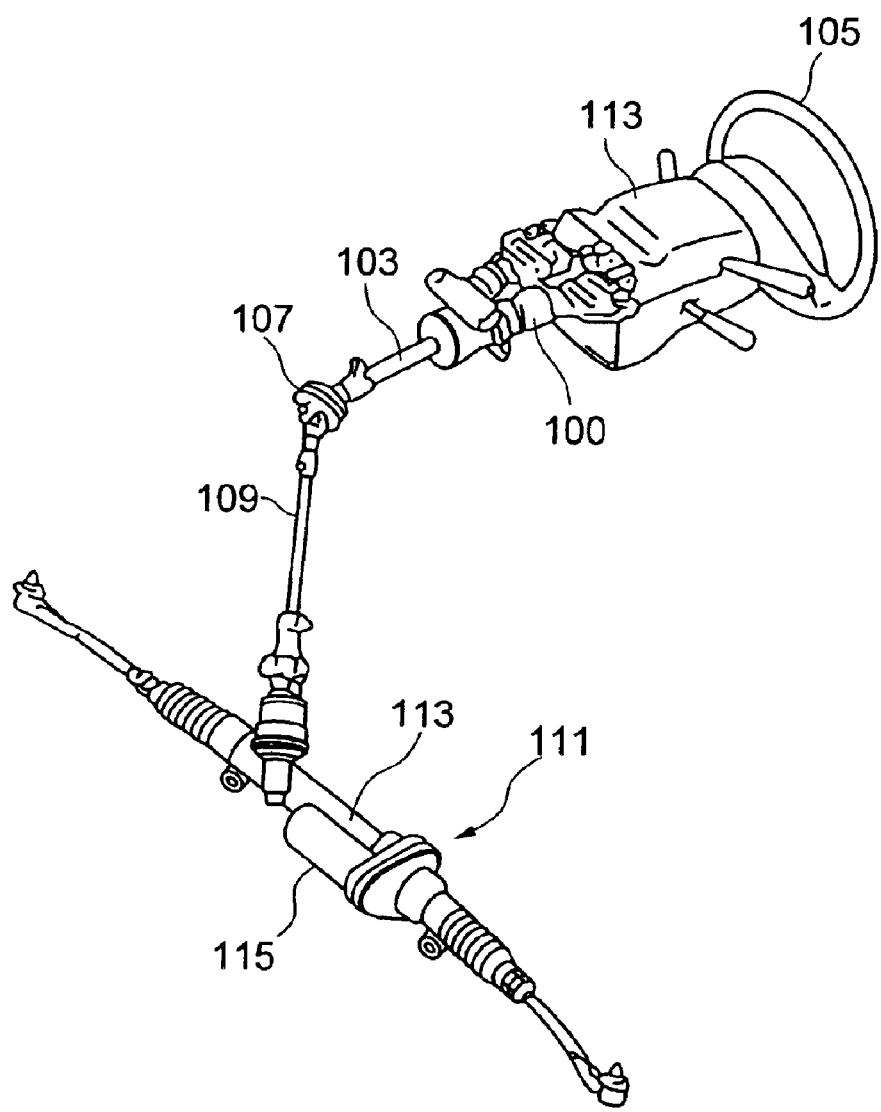
FIG. 6 is a perspective view showing an outline of a configuration of the electric power steering apparatus in a first embodiment of the second invention.

FIG. 6 is a perspective view showing an outline of a configuration of the electric power steering apparatus in a first embodiment of the second invention. A member indicated by the numeral 100 in FIG. 6 is a steering column supporting an upper steering shaft 103 rotatably. A steering wheel 105 is attached to an upper side end of the upper steering shaft 103. A lower steering shaft 109 is joined via a universal joint 107 to a lower end of the shaft 103. Further, a steering gear 111 is connected to a lower end of the lower steering shaft 109.

Figure 7:
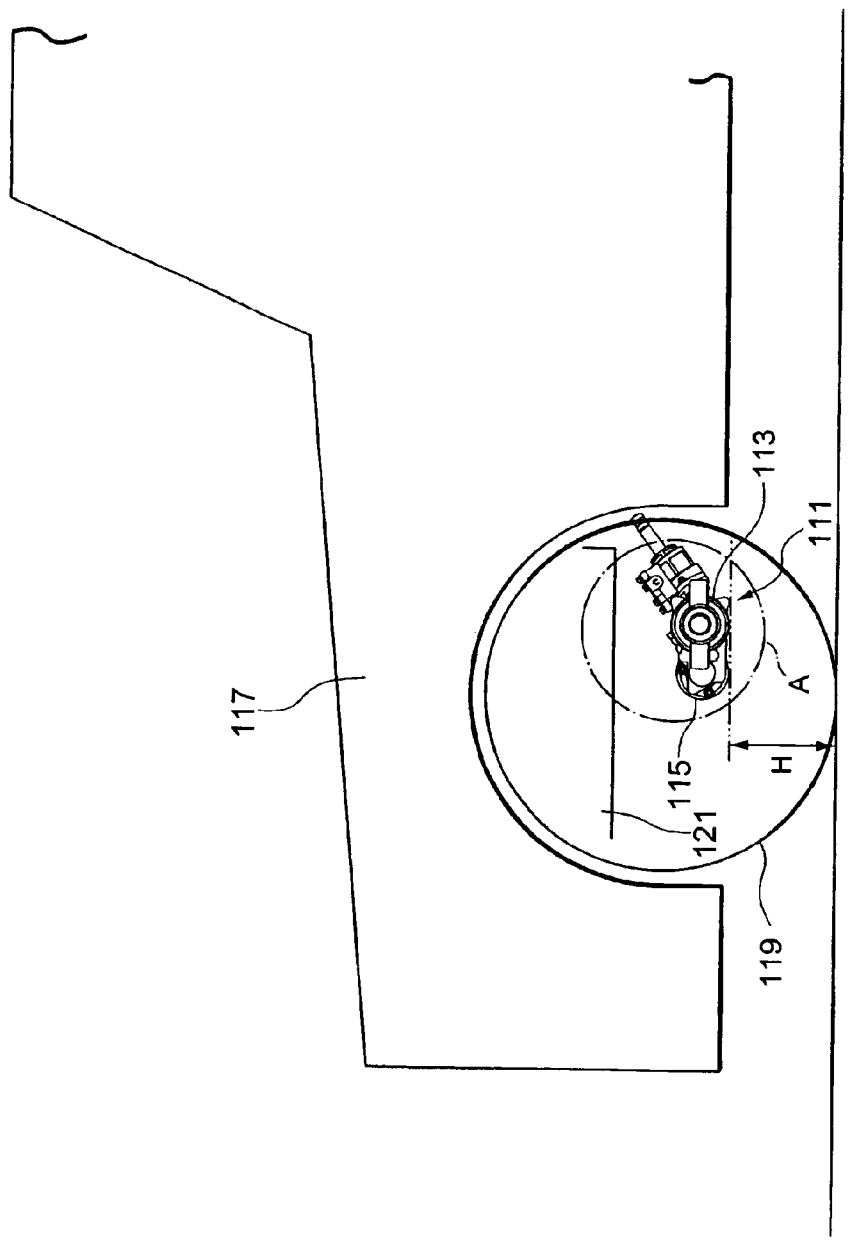
FIG. 7 is a side view showing principal components of an automobile in the first embodiment of the second invention.
Figure 8:
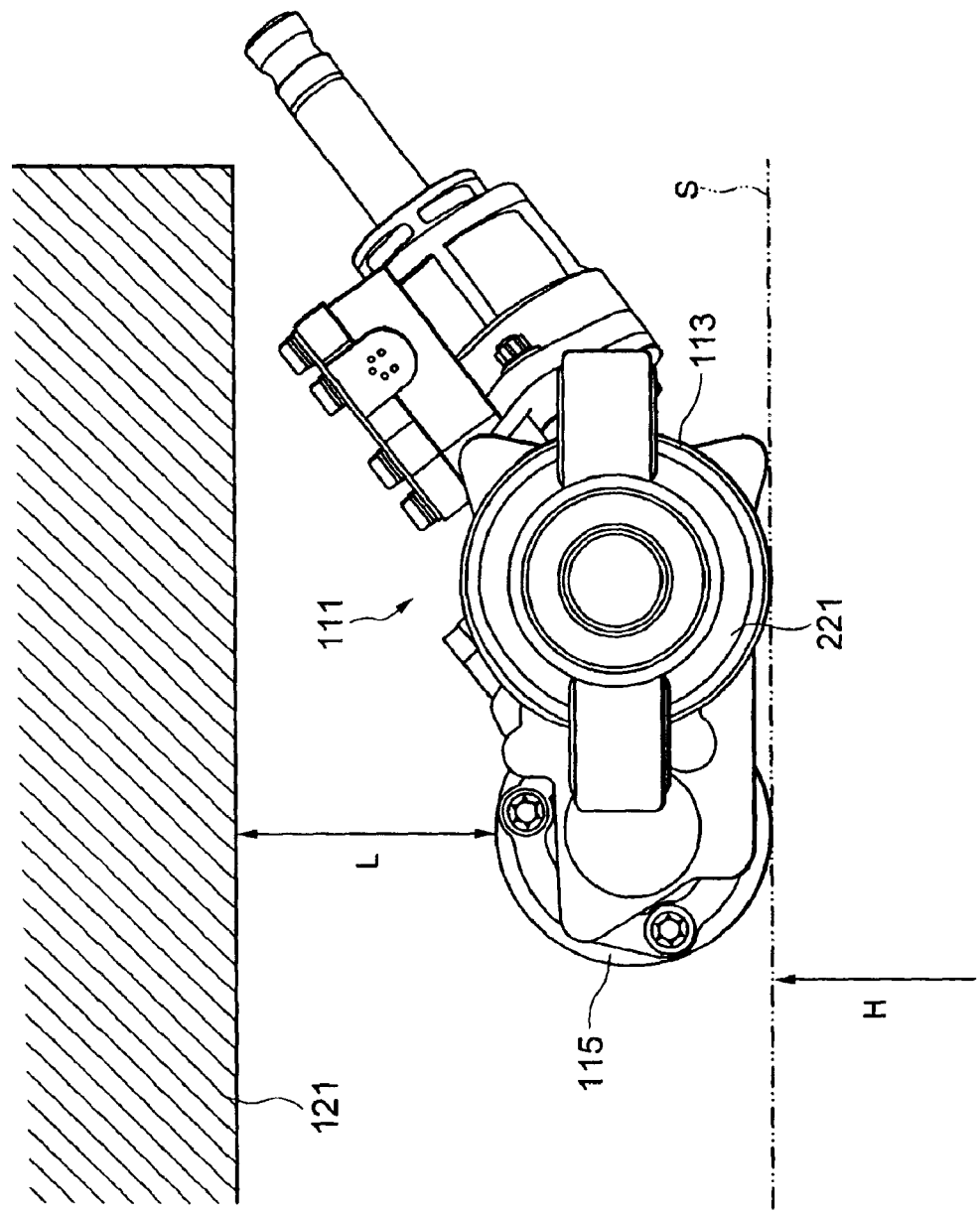
FIG. 8 is an enlarged view of a portion A in FIG. 7.

FIG. 7 is a side view showing principal components of an automobile in the first embodiment. FIG. 8 is an enlarged view of a portion A in FIG. 7. As illustrated in FIGS. 7 and 8, the steering gear 111 is constructed of a steering gear case 113 encasing a rack-and-pinion mechanism, a power assist mechanism and so on, and an electric motor 115 used for driving the power assist mechanism. Referring to FIG. 7, the numeral 117 represents a front portion of the car body, the numeral 119 designates a front wheel, and the numeral 121 denotes a heat source such as an engine etc.

The electric motor 115 is attached to the front portion of the steering gear case 113 and connected to the power assist mechanism via an unillustrated gear train. According to the first embodiment of the second invention, as depicted in FIG. 8, the lowermost portions of the electric motor 115 and of the steering gear case 113 exist within the same horizontal surface S, and a minimum road clearance H (a minimum height from the ground) is the same with respect to both.

According to the first embodiment, the steering gear 111 is thus laid out, and hence the minimum ground clearance H can be prevented from decreasing in a way that increases a distance L between the electric motor 115 and a heat source 121. Further, the electric motor 115 is disposed in front of the steering gear case 113 and therefore undergoes a direct blow of traveling wind for the duration of traveling of the vehicle. As a result, the electric motor 115 receives a less quantity of heat from the heat source 121 and undergoes effective cooling, thereby restraining a decrease in output that is attributed to a rise in temperature.

The description of the specific embodiment of the second invention comes to an end, however, the mode of the second invention is not limited to the embodiment discussed above. For example, the rotations of the electric motor are transferred to the power assist mechanism via the gear and may also be transferred via a belt. Further, according to the embodiment discussed above, the electric motor is disposed in front of the steering gear case and may also be disposed in rear thereof. Moreover, the ground clearances up to the electric motor and the steering gear case are not necessarily made completely coincident and may be fluctuated somewhat based on demands in terms of a positional relationship with the heat source and a design as well. Further, the whole construction of the electric power steering apparatus is not limited to the exemplification given in the embodiment discussed above and can be, if within the range that does not depart from the concept of the present second invention, properly changed based on requests in terms of designs and specifications.

As explained above, the electric power steering apparatus according to the second invention includes the steering gear case encasing the rack assist type power steering mechanism, and the electric motor disposed on the axis different from this steering gear case and used for driving the rack assist type power steering mechanism, wherein the minimum ground clearances up to the steering gear case and the electric motor when mounted in the vehicle are made substantially coincident. This configuration makes it possible to increase the distance between the heat source such as the engine etc and the electric motor and to restrain the output of the electric motor from decreasing due to a rise in the temperature.

Figure 9:
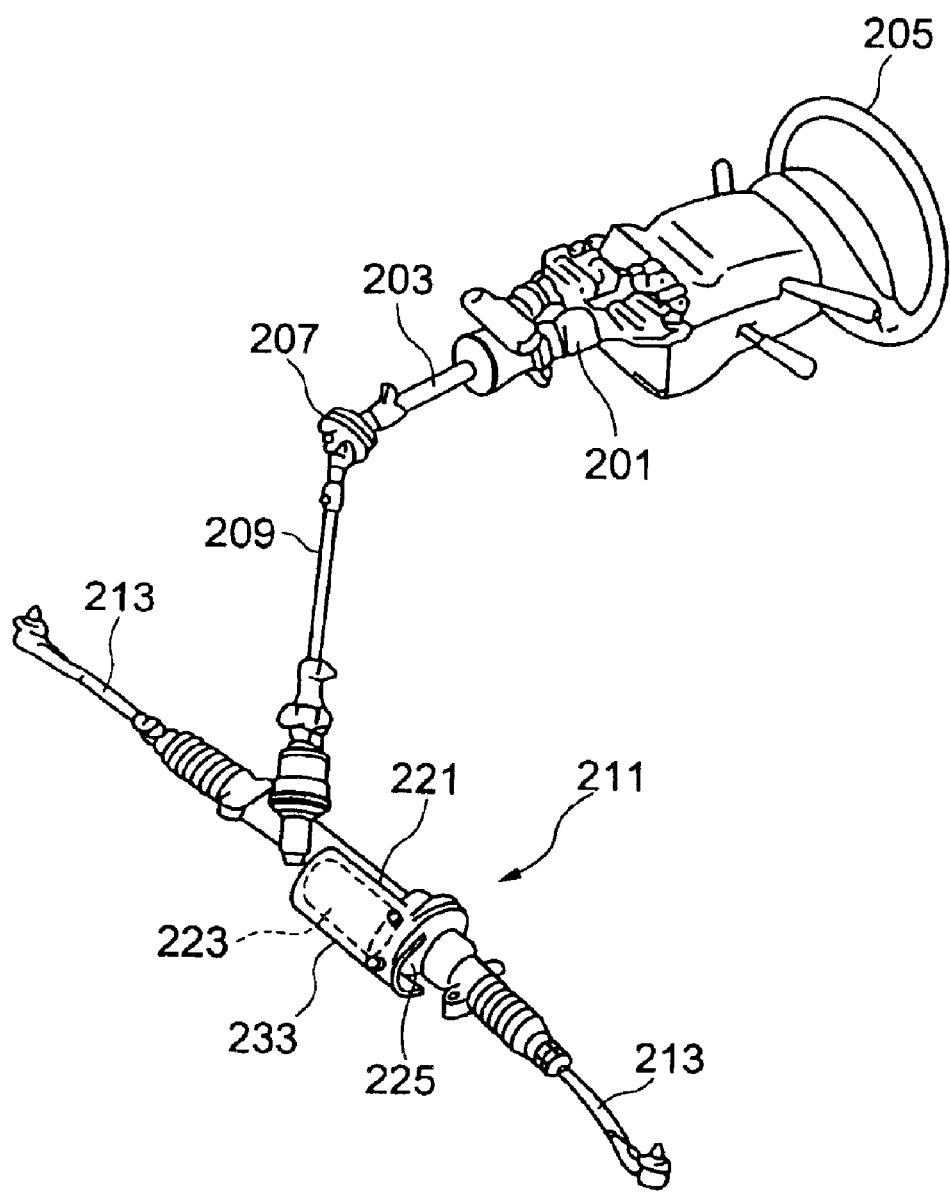
FIG. 9 is a perspective view showing an outline of a configuration of the electric power steering apparatus in one embodiment of the third invention.

FIG. 9 is a perspective view showing an outline of a configuration of the electric power steering (EPS) apparatus in an embodiment of the third invention. A member indicated by the numeral 201 in FIG. 9 is a steering column supporting an upper steering shaft 203 rotatably. A steering wheel 205 is attached to an upper end of the upper steering shaft 203. A lower steering shaft 209 is joined via a universal joint 207 to a lower end of the shaft 203. Further, a steering gear 211 is connected to a lower end of the lower steering shaft 209. Referring again to FIG. 9, the numerals 213, 213 represent tie rods connected to the right and left side ends of the steering gear 211.

Figure 10:
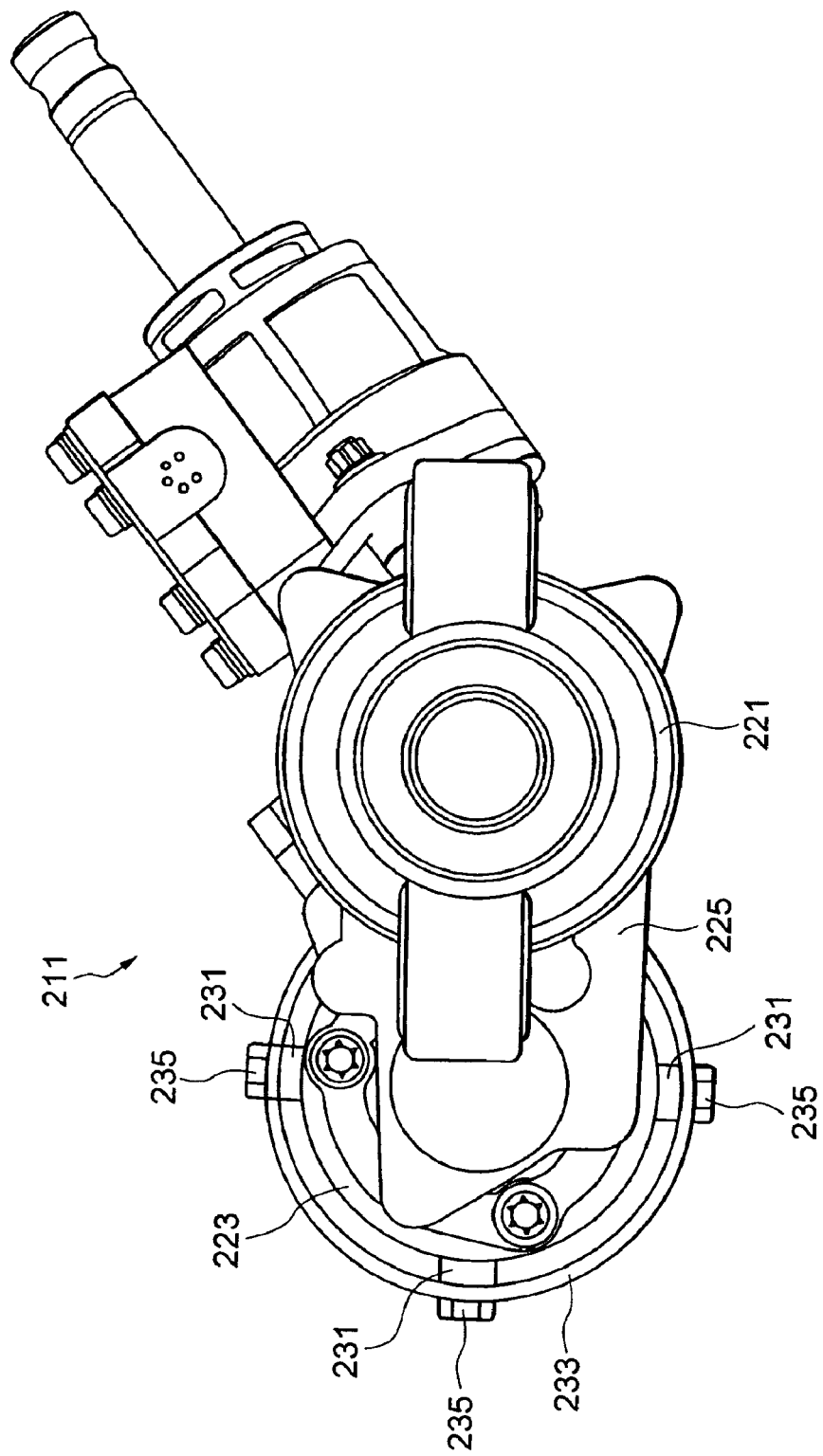
FIG. 10 is a side view showing the steering gear in the embodiment of the third invention.

FIG. 10 is a side view showing the steering gear in the embodiment. As shown in FIG. 10, the steering gear 211 is constructed of a steering gear case 221 encasing a rack-and-pinion mechanism, a power assist mechanism and so on, an electric motor 223 disposed in front of the steering gear case 221 and used for driving the power assist mechanism, and a gear housing 225 accommodating a gear train defined as a power transmission mechanism and composed of an aluminum alloy.

The electric motor 223 has bosses 231 provided as protruded members at the front portion (left side in FIG. 10) and up and down portions, respectively. A protection cover 233 taking substantially a C-shape in section and composed of a steel plate is fixed by bolts 235 to these bosses 231. According to this embodiment, the protection cover 233 extends in the right and left directions of the car body and covers the front portions of the electric motor 223 and of the gear housing 225.

The present embodiment adopts this configuration, whereby the water is not splashed over the electric motor 223 even when traveling in the rain and passing through the puddles and there does not occur such an inconvenience that the steering assist force of the EPS apparatus fluctuates due to fluctuations in torque of the electric motor 223 which are caused by abrupt cooling. Further, the pebbles rebounding up from the tires when traveling on the bad road impinge on neither the electric motor 23 nor an electric harness (not shown) nor a connector (not shown) nor the gear housing 225. It does not also happen that the electric motor 223 and the gear housing 225 are damaged, and that the electric circuits are disconnected and short-circuited.

The explanation of the specific embodiment of the third invention comes to an end, however, the mode of the third invention is not limited to the embodiment discussed above. For example, the embodiment discussed above takes the configuration in which the single protection cover covers the electric motor and the gear housing, however, a protection cover for covering only the electric motor may be adopted, or the electric motor and the gear housing may be provided with the protection covers, respectively. Further, the protection cover may involve the use of a synthetic resin injection molding product, an aluminum alloy die-cast molding product and others, and the configuration thereof and the method of fitting it to the electric motor etc are not limited to the exemplifications given in the embodiment discussed above and can be, if within the range that does not depart from the concept of the present third invention, properly changed based on requests in terms of designs and specifications.

As discussed above, the rack assist type electric power steering apparatus according to the third invention includes the protection cover that covers the housing for the electric motor and the power transmission mechanism. With this contrivance, it does not happen that the water is splashed over the housing for the electric motor and the power transmission mechanism and the rebounding pebbles collide therewith. Further, there disappears an unagreeable feeling of the steering of the EPS apparatus that is caused by the unnecessary fluctuations in torque of the electric motor, and an improvement of reliability of the electric power steering apparatus is also attained.

What is claimed is:

1. An electric power steering apparatus of a rack assist type, comprising:
    a steering gear case encasing a power assist mechanism;
    an electric motor, coupled to drive said power assist mechanism and disposed on an axis different from an axis of said steering gear case;
    power transmission means operatively interposed between said electric motor and said power assist mechanism; and
    a protection cover, attached to a casing of said electric motor, to cover said electric motor.

2. An electric power steering apparatus according to claim 1, wherein a housing accommodating said power transmission means is covered by said protection cover.

3. An electric power steering apparatus according to claim 1, wherein a housing, accommodating said power transmission means, is covered by a power transmission protection cover separate from said electric motor protection cover.

4. An electric power steering apparatus according to claim 1, wherein said electric motor protection cover is attached to said electric motor casing through a plurality of bosses.

5. An electric power steering apparatus according to claim 4, wherein said protection cover is substantially C-shaped in cross-section.

6. An electric power steering apparatus, comprising:
a rack-and-pinion mechanism;
a power assist mechanism coupled to the rack-and-pinion mechanism;
a steering gear case, encasing the rack-and-pinion mechanism and the power assist mechanism;
a power transmission mechanism coupled to the power assist mechanism;
an electric motor, coupled to the power transmission mechanism and having an axis different from an axis of said steering gear case; and
a protection cover, attached to a casing of the electric motor, to cover the electric motor.

7. An electric power steering apparatus according to claim 6, wherein the protection cover is also attached to a housing of the power transmission mechanism and covers both the electric motor and the power transmission mechanism.

8. An electric power steering apparatus according to claim 6, further comprising:
a power transmission mechanism protection cover, attached to the power transmission mechanism housing, to cover the power transmission mechanism.

9. An electric power steering apparatus according to claim 6, wherein said electric motor protection cover is attached to said electric motor casing through a plurality of bosses.

10. An electric power steering apparatus according to claim 9, wherein said electric motor protection cover is substantially C-shaped in cross-section.

* * * * *